UNITED STATES PATENT OFFICE.

GEORGE ARCHBOLD, OF NEW YORK, N. Y., ASSIGNOR TO HIRAM GILBERT BOND, OF SAME PLACE.

PROCESS OF DEPHOSPHORIZING IRON.

SPECIFICATION forming part of Letters Patent No. 412,447, dated October 8, 1889.

Application filed August 23, 1889. Serial No. 321,769. (Specimens.)

*To all whom it may concern:*

Be it known that I, GEORGE ARCHBOLD, a subject of the Queen of Great Britain, and a resident of the city of New York, New York county, and State of New York, have invented certain new and useful Improvements in the Process of Dephosphorizing Iron, of which the following is a specification.

It is well known that the iron made from certain classes of ores, more especially those found in the Southern States, contains such large percentages of phosphorus, or phosphorus and sulphur, as to render it unfit for many uses to which iron can be applied. Many attempts have been made to overcome these objections, and numerous methods of treating such iron have been suggested.

My invention has for its object the elimination of phosphorus, or phosphorus and sulphur, in the process of smelting such ores. Heretofore it has been considered impracticable to treat the molten iron at this stage of its manufacture to eliminate these objectionable substances; but I have found that by my invention this can be accomplished in a cheap, efficient, and satisfactory manner.

I will now describe one way in which I have successfully carried out my invention, and while this is the preferred way, I do not wish to limit my invention to the particular process or application of the process herein set forth, as it may be carried out in other ways by those skilled in the art without materially departing from the principles thereof. I use an ordinary blast-furnace, which need not be described herein. I add to the melted mass of metal in the furnace salts of barium, preferably the carbonate of barium, in the form termed "witherite," in the proportion at least of two parts, by weight, of barium carbonate to each part of phosphorus and sulphur contained in the molten mass, such being the equivalent proportions in which barium carbonate chemically combines with both phosphorus and sulphur. The amounts are easily determined by knowing the analysis of the iron ore and coke. The barium carbonate can be distributed in lumps throughout the ore, coke, and limestone in the furnace, or it may preferably be placed in pulverized form in the tuyeres, through which the air will force it into the mass of molten metal which accumulates in the lower part of the furnace, or it may be introduced in any other manner that will bring the requisite proportion of barium carbonate into complete contact with the melted mass. In the molten mass the phosphorus and sulphur are in the form of phosphide of iron and sulphide of iron, which readily combine with the barium carbonate, forming barium phosphide and barium sulphide, and these are carried off in volatile waste products and in the slag, the purified metal being drawn off as usual. For instance, an iron ore containing 0.30 per cent. of phosphorus and a quantity of sulphur, when reduced by the ordinary process, contains in the pig-iron 0.75 per cent. of phosphorus and a corresponding amount of sulphur, and is unfit for making steel by the ordinary Bessemer process, which requires iron containing not more than about 0.10 per cent. of phosphorus; but when subjected to the action of barium carbonate, substantially in the manner above set forth, such ore produces pig-iron containing only 0.068 per cent. of phosphorus and a mere trace of sulphur, which is fit for use in the Bessemer process and for other uses to which pig-iron containing a large percentage of phosphorus cannot be applied. The salts of barium may also be used in the form of oxides, nitrate, and other oxysalts of barium; but there are advantages in using barium carbonate. At the melting-point of iron the contained phosphorus and sulphur have a greater chemical affinity for the barium carbonate than for the iron, and they completely unite with the barium carbonate as rapidly as contact is effected, not again uniting with the iron at any temperature required for smelting iron, and the resulting products pass off as volatile matter and in the slag. The other salts of barium above mentioned do not unite with the phosphorus and sulphur as readily as the barium carbonate does, except the oxides of barium, which, however, are not obtained as readily as the barium carbonate. Moreover, barium carbonate can be obtained more cheaply and in greater quantities than any of the other salts mentioned. These results may be accomplished to a certain extent by using salts of strontium instead of salts of barium, but not as completely and perfectly as by salts of barium, and I therefore prefer using salts of barium.

I claim—

The method, substantially as herein described, of smelting iron ores, which consists in reducing the charge in the presence of the above-described oxysalts of barium.

In testimony whereof I have signed my name to this specification in the presence of two subscribing witnesses.

GEORGE ARCHBOLD.

Witnesses:
J. S. BARKER,
FRANK H. PLATT.